United States Patent
Brockhurst et al.

(10) Patent No.: US 11,631,038 B2
(45) Date of Patent: Apr. 18, 2023

(54) SYSTEM AND METHOD FOR MULTI-PHASE OPTIMIZATION OF HAUL TRUCK DISPATCH

(71) Applicant: Caterpillar Inc., Peoria, IL (US)

(72) Inventors: Russell A. Brockhurst, Carindale (AU); Kevin E. Gates, St. Lucia (AU)

(73) Assignee: Caterpillar Inc., Peoria, IL (US)

( * ) Notice: Subject to any disclaimer, the term of this patent is extended or adjusted under 35 U.S.C. 154(b) by 230 days.

(21) Appl. No.: 16/855,220

(22) Filed: Apr. 22, 2020

(65) Prior Publication Data

US 2021/0334720 A1 Oct. 28, 2021

(51) Int. Cl.
*G06Q 10/06* (2012.01)
*G06Q 10/0631* (2023.01)
*G06N 20/00* (2019.01)
*G08G 1/00* (2006.01)
*E02F 9/20* (2006.01)

(52) U.S. Cl.
CPC ..... *G06Q 10/06313* (2013.01); *E02F 9/2054* (2013.01); *G06N 20/00* (2019.01); *G06Q 10/06312* (2013.01); *G06Q 10/06314* (2013.01); *G08G 1/202* (2013.01)

(58) Field of Classification Search
None
See application file for complete search history.

(56) References Cited

U.S. PATENT DOCUMENTS

| | | | |
|---|---|---|---|
| 8,046,319 B2 | 10/2011 | Satir et al. | |
| 10,289,968 B1 | 5/2019 | Gersitz et al. | |
| 10,853,748 B2 * | 12/2020 | Ha | G06Q 50/30 |
| 2008/0046272 A1 | 2/2008 | Menabde et al. | |
| 2009/0327011 A1 | 12/2009 | Petroff | |
| 2010/0023170 A1 * | 1/2010 | Sherwood | G05B 9/02 700/282 |
| 2010/0114808 A1 | 5/2010 | Mintah | |
| 2011/0277849 A1 * | 11/2011 | Romano | A61M 1/0001 137/14 |
| 2012/0046983 A1 * | 2/2012 | Nettleton | G06Q 10/00 705/7.12 |
| 2013/0099017 A1 | 4/2013 | Gudat et al. | |
| 2014/0229101 A1 * | 8/2014 | Glaser | G01C 21/34 701/538 |

(Continued)

FOREIGN PATENT DOCUMENTS

| | | |
|---|---|---|
| CN | 109190835 A | 1/2019 |
| JP | 4449253 B2 | 4/2010 |
| WO | WO 2016/118122 A1 | 7/2016 |

OTHER PUBLICATIONS

Written Opinion and International Search Report for International Patent Appln No. PCT/US2021/028057, dated Aug. 6, 2021 (13 pgs).

*Primary Examiner* — Folashade Anderson
(74) *Attorney, Agent, or Firm* — Perkins Coie LLP

(57) ABSTRACT

A system and method for dispatching haul trucks includes a production planner configured to operate based on a production plan. The production planner computationally defines production arcs for transferring material from loading tools to dump sites, computationally develops one or more possible return arcs for each production arc, compiles a set of possible return arcs, and computationally selects a sub-set of the possible return arcs to command a real time dispatcher.

17 Claims, 10 Drawing Sheets

(56) References Cited

U.S. PATENT DOCUMENTS

| | | | |
|---|---|---|---|
| 2017/0023372 A1* | 1/2017 | Van Latum | G01C 21/362 |
| 2017/0053220 A1* | 2/2017 | Marsolek | G06Q 10/0637 |
| 2017/0109673 A1 | 4/2017 | Bell | |
| 2019/0033808 A1* | 1/2019 | Mountford | G05B 19/042 |
| 2019/0153701 A1 | 5/2019 | Gates | |
| 2020/0011175 A1* | 1/2020 | Gates | E21C 41/26 |
| 2020/0378088 A1* | 12/2020 | Anderson | E02F 9/262 |
| 2021/0008997 A1* | 1/2021 | Marsolek | B60L 53/305 |

\* cited by examiner

SYSTEM AND METHOD FOR MULTI-PHASE OPTIMIZATION OF HAUL TRUCK DISPATCH

TECHNICAL FIELD

This patent disclosure relates generally to systems and methods for dispatching vehicles and, more particularly, to systems and methods for dispatching haul trucks between loading and unloading areas in a surface mining operation.

BACKGROUND

Certain applications, such as strip mining, involve the transportation of aggregate material, such as ore, from a mining site to a processing or shipping facility. Typical mining operations use guided haul trucks that carry the extracted material from an extraction area or material source to a deposition area or a material sink. A typical large scale mining operation may include more than one material source and more than one material sink. The haul trucks used to transport the material may be autonomously guided, i.e., operate without a driver, and may perform hundreds of trips daily as some mining operations operate around the clock. The loading of the aggregate material onto the haul trucks is typically accomplished by use of wheeled loaders or excavators, material conveyors, shovels, and the like.

For many large commercial mining operations, maximization of equipment utilization is desired to maximize profit. The maximization of equipment utilization, especially in the case of autonomously guided vehicles, requires efficient dispatching of the haul trucks to the various loading and unloading stations. Various methods have been proposed in the past to optimize haul truck dispatching. For example, manual dispatch may be used to direct the haul trucks to the most efficient task at any given time. As can be appreciated, however, manual dispatch may not be as efficient as an automated task that performs the same function.

Another type of dispatch is a so-called "restricted" automatic dispatch, in which haul trucks are dispatched automatically based on restrictions defined by controllers of the mining site. Such controllers may include rules or limitations on haul truck assignments such as limiting a specific truck to a specific loading tool or dump site. If such limitations are removed, automatic dispatch can be used in which haul trucks are dispatched automatically to maximize production within the constraints of a daily production plan.

While the manual dispatch of trucks may be used effectively at small mine sites, complexity increases dramatically with mine site size making the manual dispatch of Haul Trucks for large sites impractical. Restricted Automatic Dispatch can be used effectively at larger mine sites provided that Mine Site Controllers are vigilant and continuously manage the restrictions to optimize production. The preferred solution is to move to fully Automatic Dispatch so that mine operations may be optimized without the need for continuous intervention by controllers applying rules to the dispatch.

Caterpillar's MineStar™ system is one example of an automatic dispatch system. This system in its present form includes a multi-phase optimization of haul truck dispatch that periodically produces a production plan, based on a user's production target at a mine. The system dispatches haul trucks in near real time based on the defined production plan. In current implementations of this multi-phase optimization, the production plan includes information only on Loaded Production Arcs, which is a term used to describe a segment travelled by a loaded truck from a loading tool to a processor or material dump. When a haul truck is loaded at a loading tool, its next assignment is constrained by the Loaded Production Arcs included in the production plan. When the haul truck dumps its payload at the processor, it is automatically assigned to the neediest loading tool, that is, to the loading tool that is more immediately ready to carry out a loading operation, a loading tool having a higher priority that other loading tools, and the like.

This approach is consistent with other previously proposed approaches. For example, US20090327011A1 describes that " . . . the optimum schedule defining the number of trips taken along paths between the destination locations and the source locations H achieve the optimum production;" and WO2016118122A1, which describes that "Truck assignment as a part of a dispatching system has a role to determine the number of trucks from each fleet that should be operating between any particular pair of loading (loaders, shovels) and dumping locations (dump areas) to meet production requirements."

However, while these existing and previously proposed solutions are more effective than manual dispatch in increasing production rates at a mine, further improvements are also desirable.

SUMMARY

In one aspect, the disclosure describes a resource allocation optimization system for automatically controlling hauling operations of one or more haul trucks. The system includes a production planner circuitry for serving a plurality of circuits, each of the plurality of circuits comprising at least one production site and at least one dump site. The production planner is configured to determine, for each of the plurality of circuits, a production plan comprising a production site, a dump site, a production plan, a set of production arcs and a set of return arcs. The production plan includes information indicative of a production goal that includes a rate of transfer of material from the one or more loading tools to the one or more dump sites within each of the plurality of circuits. In one embodiment, the production planner computes an estimated rate of transfer of material based on each of the one or more haul trucks executing each of the set of production arcs or return arcs, and monitors an actual rate of transfer of material based on each of one or more haul trucks executing each of the set of production arcs or return arcs.

In one embodiment, the estimated rate of transfer of material is compared with the actual rate of transfer of material. When the actual rate of transfer of material is more than the estimated rate of transfer of material in one particular circuit of the plurality of circuits, resources are reallocated away from the one particular circuit. Similarly, when the actual rate of transfer of material is less than the estimated rate of transfer of material in the one particular circuit, resources are reallocated to the one particular circuit. When the actual rate of transfer of material is equal to the estimated rate of transfer of material, no action is taken regarding allocation of resources to the one particular circuit.

In one embodiment, reallocating resources to/away from the one particular circuit is accomplished within the production planner, and includes executing computer executable instructions for: computationally defining a set of production arcs to be executed by the one or more haul trucks for transferring material from the one or more loading tools to the one or more dump sites, computationally developing a set of possible return arcs for each haul truck executing a particular one of the set of production arcs, computationally selecting a sub-set of return arcs from the set of possible return arcs, and commanding a real time dispatcher to execute the set of production arcs and the sub-set of return arcs.

In another aspect, the disclosure describes a method for automatically dispatching and controlling hauling operations of one or more haul trucks. The method includes providing a production planner for serving a plurality of circuits, each of the plurality of circuits including one or more loading tools and one or more dump sites, wherein the production planner is configured to operate based on a production plan. The method further includes computationally defining a set of production arcs to be executed by the one or more haul trucks for transferring material from the one or more loading tools to the one or more dump sites, computationally developing one or more possible return arcs for each haul truck within one of the plurality of circuits for executing a particular one of the set of production arcs, determining a total truck count required for each of the plurality of circuits, and estimating an actual truck count required for each of the plurality of circuits. The method additionally includes computationally selecting a sub-set of return arcs from the set of possible return arcs to minimize at least one operating parameter of the one or more haul trucks, and commanding a real time dispatcher to execute the set of production arcs and the sub-set of return arcs.

In yet another aspect, the disclosure describes a system for automatically dispatching and controlling hauling operations of one or more haul trucks. The system includes a production planner for serving a plurality of circuits, each of the plurality of circuits including one or more loading tools and one or more dump sites. The production planner is configured to operate based on a production plan and is configured to computationally define a set of production arcs and return arcs to be executed by the one or more haul trucks for transferring material from the one or more loading tools to the one or more dump sites that satisfies the production plan under a concept of optimizing the flow on the production arcs. The production planner is further configured to computationally select a set of return arcs to be executed by the one or more haul trucks for travelling from the one or more dump sites to one of the one or more loading tools.

The system further includes a dispatcher configured to execute commands directing the one or more haul trucks to carry out the set of production arcs and the of return arcs at an expected travel time and service time for each. The system additionally includes a virtual controller configured to monitor actual travel and service times for each of the one or more haul trucks, compare the actual travel and service times with the expected travel time and service time for each haul truck to determine an actual production rate, and adjust the set of production arcs and return arcs to minimize any difference between the actual production rate and the desired production goal.

DETAILED DESCRIPTION

Figure 1:
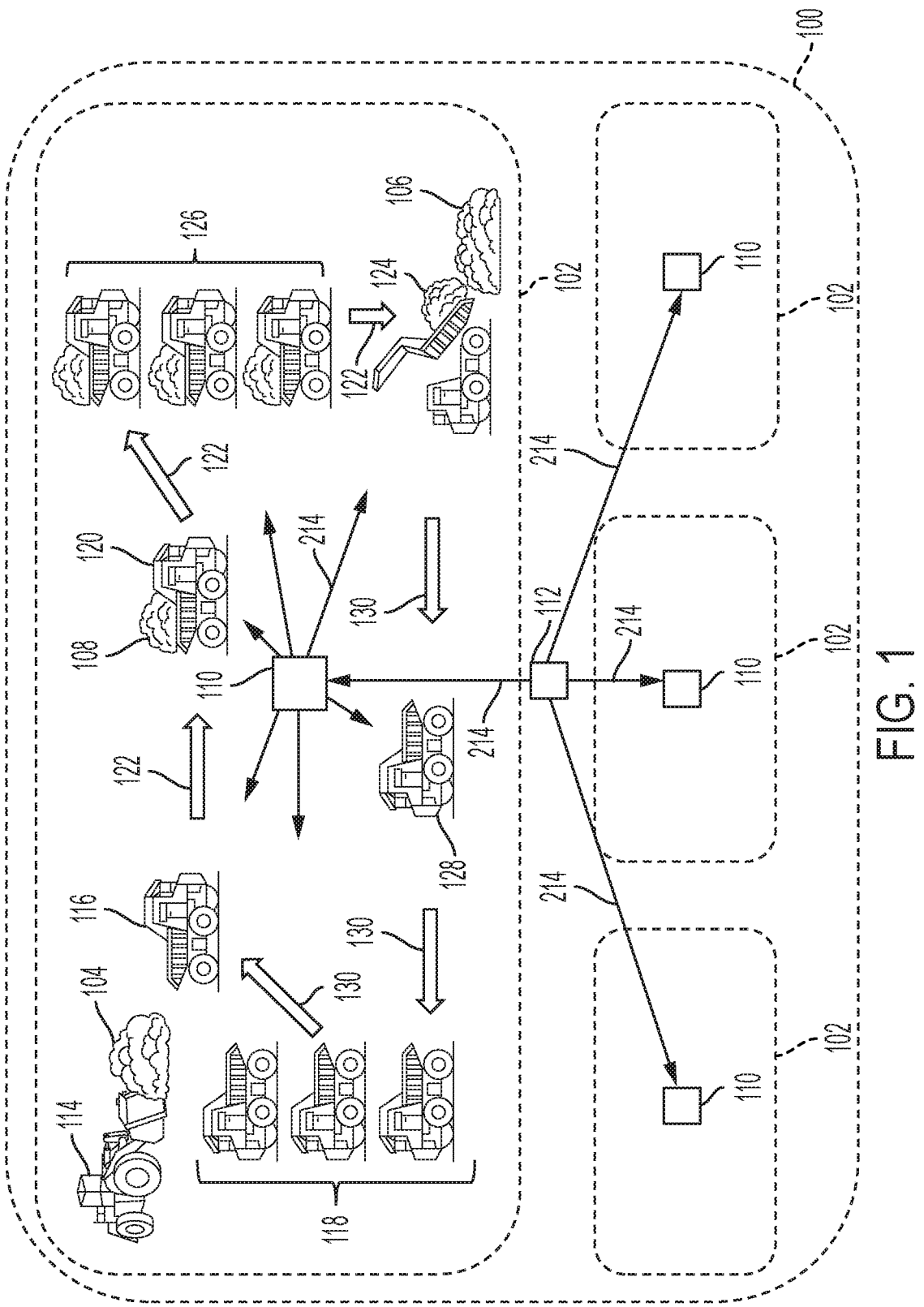
FIG. 1 is a schematic view of a mining site in accordance with the disclosure.

The present disclosure is applicable to systems and methods for dispatch of assets in a work area. The assets contemplated herein are transport assets used to transport material from one or more material production sites to one or more material consumption sites. The particular implementations of the systems and methods to a mining site are described herein as exemplary embodiments to illustrate various aspects of the disclosure. In the embodiments described, haul trucks are dispatched by the system automatically to carry mined aggregates between loader locations and dump locations. In certain embodiments, the systems and methods also dictate or specify the particular travel path from the dump locations to the loading locations that the haul trucks will use.

In general, detailed investigations of the haul truck assignments or dispatches in a mine in accordance with the disclosure result from application of a multi-phase optimization via production arcs and return arcs. Production arcs indicate haul truck travel segments, in which the haul truck travels from a source location, where the haul truck is loaded with material, to a destination location, where the haul truck dispatches the previously loaded material. Return arcs represent haul truck travel segments, in which after dispatching the material at the destination location, the empty haul truck travels from the destination location to a next source location. The source location that follows a destination location need not necessarily be the same source location from which the haul truck came from.

Previous solutions that used optimization based on only production arcs has revealed that fully automated dispatch of haul truck arcs was unable to reliably achieve total production or compliance with a production plan. Because the production plan was defined only by production arcs, the near real time assignment of haul truck was sub-optimal, especially with respect to return arcs.

In the previous systems and methods, haul trucks were occasionally dispatched to return arcs that were long, which detracted from the production capability of all assets involved and was not optimal with respect to satisfying aggressive production plans. Each assignment to a return arc that was not contemplated in the production plan constituted waste of resources, or lost production, which made it more difficult for the system to achieve the defined production plan. The systems and methods illustrated in the embodiments described herein provide for optimization of a production plan based on return arcs as well as production arcs, and further introduce a mechanism to monitor and optimize overall mine site operations.

In the description that follows, exemplary embodiment of autonomous haul trucks is used for sake of description, as this represents an application that can benefit from the advantages of the disclosed system and method, but it should be appreciated that the systems and methods described herein are applicable to any dispatch application used to control assets at a mine site, whether those assets are operated manually by humans or autonomously. It should be appreciated, however, that even manually operated assets can benefit from automated dispatch systems and methods as described herein.

A schematic view of a mining site 100 in accordance with the disclosure is shown in FIG. 1. The mining site 100 may include one or more production circuits 102, which relevant to the present disclosure can include one production site 104, one dump site 106, and one or more haul trucks 108 travelling between the production and dump sites 104 and 106. It should be appreciated that, depending on the material being produced, each circuit 102 may exclusively include its respective production and dump sites 104 and 106. Alternatively, one production site 104 and/or one dump site 106 may be part of more than one circuit 102, for example, when material from one production site is used at more than one dump sites 106 or, similarly, when the production at a dump site 106 requires material from more than one production site 104.

In the mining site 100, each circuit 102 may include a dedicated controller 110 that can monitor, control and/or relay information to or from assets such as a plurality of haul trucks, which are denoted generally as 108, and other machines that may be operating within each particular circuit 102. A central controller 112 may communicate with the various circuit controllers 110 to relay and exchange high-level information that pertains to the mining site 100 as a whole.

Each circuit 102 can include at least one production site 104, which may be operated by one or more loaders 114. During operation, one or more haul trucks 108 may arrive at the production site 104 for loading, for example at a position 116. A production queue 118 may stack incoming haul trucks 108. A loaded haul truck 120 may travel a production arc 122 between the loading position 116 and a dump position 124 at the dump site 106. Loaded haul trucks may similarly be stacked at a dump queue 126 while waiting to assume the dump position 124. Emptied haul trucks 128 may travel a return arc 130 between the dump position 124 and the production queue 118 or the loading position 116 before repeating the production arc 122. This process, or a variant thereof, may be carried out in each of the circuits 102 during operation.

The rate of material transfer from the production site 104 to the dump site 106 can be generally quantified and compared to a target production rate defined within a production plan for the circuit 102. This production rate, from an asset engagement perspective, occupies a plurality of haul trucks 108 that are assigned to, or engaged in, the particular circuit 102 during operation. As can be appreciated, in any given circuit, longer wait times of haul trucks in queues 118 and 126 can slow down the scheduled deliveries thereby reducing the overall production rate for that particular circuit. Moreover, the production plan at each particular circuit, even if optimized at the beginning of the production cycle, requires re-optimization due to longer wait times in queues 118 and 126. An updated production plan is provided to cure the infirmity and reach the target production rates. To accomplish this, in part, the number of haul truck assignments to a circuit may be changed (increased or decreased) based on the updated production plan. In general, the production plan defines the amount of material moved from one or more locations in the mine to one or more other locations in the mine, which material movement can be expressed as a total tonnage of material over a period of time that is moved, or alternatively a rate of transfer of material in tons per hour, and the like. The present disclosure provides a solution to address the low productivity concerns via optimization and re-optimization of resources over an entire mining site, as opposed to only a particular circuit, which can be carried out automatically and in real time or "on-the-fly" in a few different respects, which will be discussed hereinafter.

Figure 2:
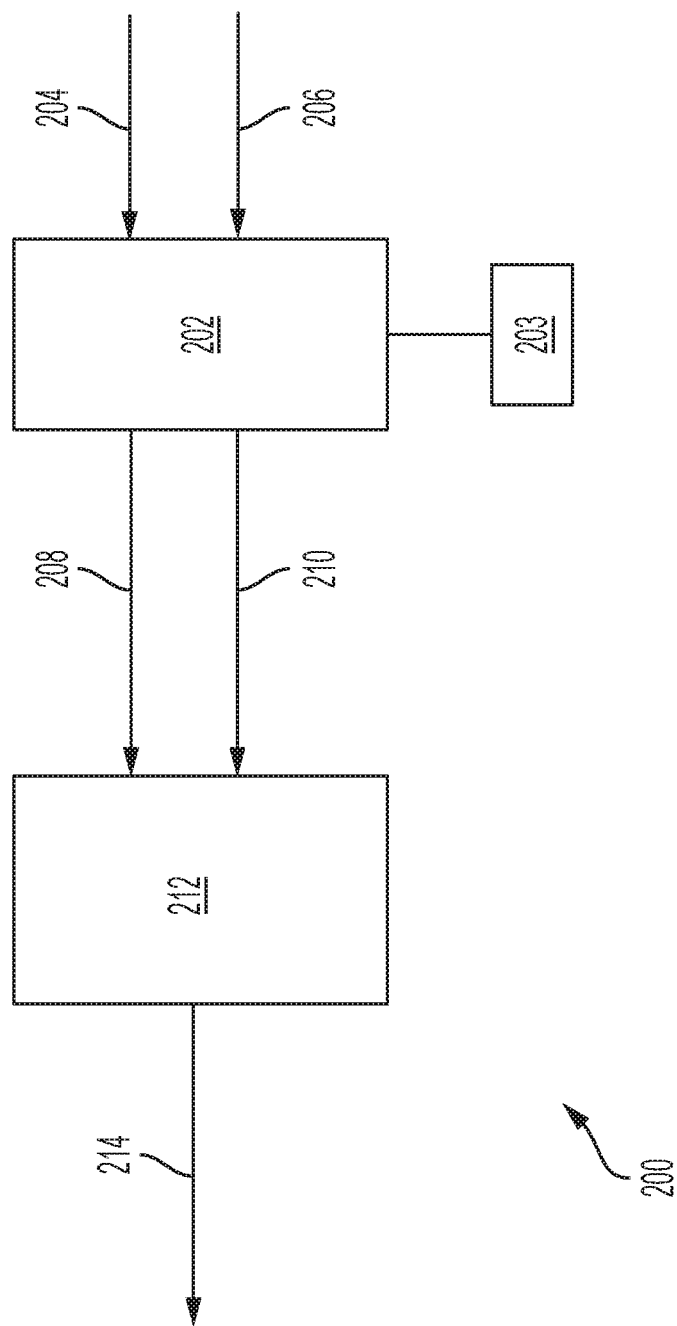
FIG. 2 is a block diagram of a dispatch system in accordance with a first embodiment of the disclosure.

FIG. 2 is a block diagram of a dispatch system 200 in accordance with a first embodiment of the disclosure. The dispatch system 200 includes a production planner 202, which may be operating within or in conjunction with the central controller 112 (FIG. 1). The production planner, which may be implemented in the form of computer executable instructions in non-transitory computer media, includes algorithms that use various computational or algorithmic methods to process a desired production plan. The desired production plan may be provided by a user and input into the system. For example, the production planner 202 may include computer hardware and/or software that includes memory devices, user input and output instrumentalities, a processor, database, wired and/or wireless communication devices and other structures that are configured to receive, process and send information to/from the production planner 202.

In the illustrated embodiment, the production planner 202 is configured to receive as an input a production plan 204. The production plan 204 may be manually or automatically input into the production planner 202 and can include information on the desired or target production for the mine on a daily basis, production goals for the mid- or long-term operation, production types and timing of product delivery for the mine, scheduling, and other information relating directly to the desired type, amount and timing of mine output or production. This information may be input by a user by defining various system parameters included in a software application that is operating within the production planner 202, or may alternatively be provided automatically, for example, by processing customer orders for material that are submitted by customers, for example, over an internet-based ordering system. Regardless of the type or method of input of this information, the production plan 204 is provided to the production planner 202 and serves as a basis for all or most subsequent operations in the dispatch system 200.

In addition to the production plan 204, the production planner 202 further receives as an input mine state information 206, which can be provided manually by a mine operator or can be extracted automatically by the production planner 202. The mine state information 206 includes information indicative of the number and operational state of haul trucks that are available for work at any one time, the number, capacity and operational state of loading tools, processors, materials and mining blocks that are active, the type of material blocks that are active, the location of material blocks, and the like. In general, the mine state information 206 provides information indicative of all useable resources available at any given time at the mine for production, transportation and processing of one or more products produced or placed at the mine.

Based at least on the production plan 204 and mine state information 206, the production planner 202 uses various methods to calculate or estimate the production arcs 208 and empty production or return arcs 210 that are available or required to achieve or optimally approximate the production plan 204 based on the mine state information 206. These calculations may be carried out using various methods. In the illustrated embodiment, the production planner 202 uses artificial intelligence (AI) methods of assigning the number of production arcs 208 that suffice to achieve a production goal, and the corresponding return arcs 210 that result from the production arcs 208. In the illustrated embodiment, an AI engine 203 is shown in conjunction with the production planner 202. During operation, a desired production in tons/hour can be calculated based on a production goal for a finite time period (e.g. 24 hrs. of mine operation) based on the payload carrying capacity of the haul trucks (in tons/arc), the number of haul trucks available for transfer, the transfer and return times, the distance between the source location or production site to the destination location or dump site, and the production rate of the loaders. Each production arc 208 will have a return arc 210 associated with it.

As can be appreciated, optimization of mine resource utilization can vary greatly based on the various haul truck assignments that are made to achieve a target production rate via the various production arcs 208 and return arcs 210. This optimization task is carried out by the dispatcher 212, which receives the production and return arc information 208 and 210 from the production planner 202. The dispatcher 212 processes the production and return arcs 208 and 210, and sends dispatch commands 214 to each mining asset, including specifically the various haul trucks 108 (FIG. 1). The commands 214 are specific commands for each truck 108 in each circuit 102 to perform a specific task. Each of the trucks 108 may be operated by a human operator, or may be self-driven. In either case, the commands or assignments are received autonomously by the dispatcher 212. While the trucks perform the various tasks, information is provided back to the dispatcher 212 that indicates task progress, truck position, diagnostics and other information such that subsequent tasks can be assigned to a truck when, for example, a production or return arc is completed.

The dispatcher 212 may be operating within the central controller 112 (FIG. 1), which can disseminate information between the central controller 112 and the various circuit controllers 110, which in turn relay information to/from the various assets including the haul trucks 108. The dispatcher 212, like the production planner 202, may be implemented in the form of computer executable instructions in non-transitory computer media includes an algorithm that use various computational or algorithmic methods to process the target production and return arcs into particular assignments for the haul trucks. As such, the dispatcher may be implemented in the form of computer hardware and/or software that includes memory devices, user input and output instrumentalities, a processor, database, wired and/or wireless communication devices and other structures that are configured to receive, process and send information to/from the production planner dispatcher 212 and various other external systems including systems operating and/or controlling operation of the haul trucks 108.

During operation, the dispatcher 212 operates using various methods including statistical methods and AI models to minimize the time spent by haul trucks 108 executing non-production return arcs 130 (FIG. 1). To achieve this result, it is often the case that a truck may not return to the same loading location from which it was loaded on production arc that was just completed, but rather be re-routed to a different production location, possibly within a different circuit, that is either closer, has a higher priority, or is expected to be ready to load sooner than other loading locations. To determine the optimal return arc, the dispatcher 212 may determine many possible return arcs for the same haul truck before selecting the return arc that is most optimal in terms of distance and time for the particular haul truck.

Some exemplary operating conditions are shown in the block diagrams of various mining sites that follow.

Figure 3:
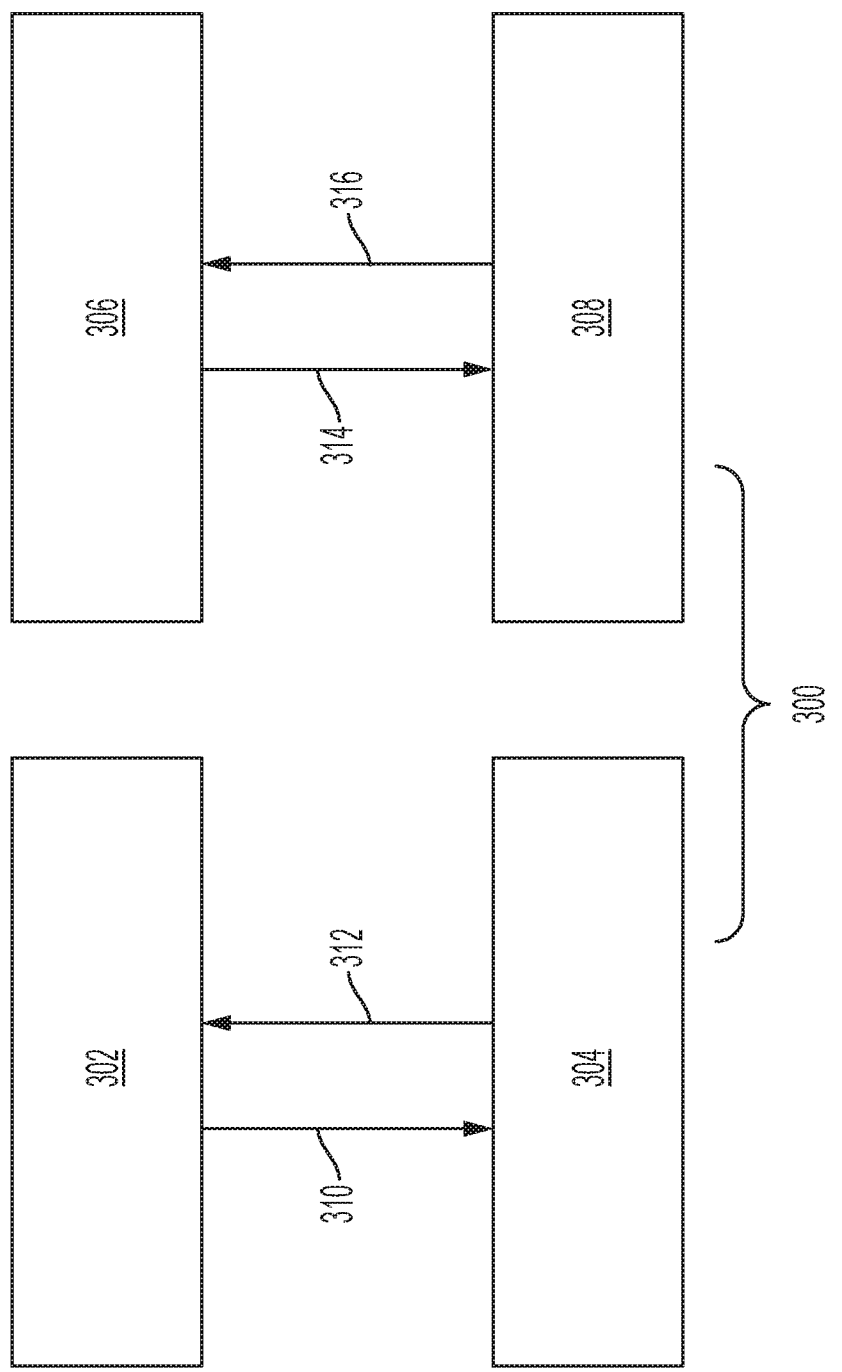
FIGS. 3-6 are block diagrams of various mining site operation conditions in accordance with the disclosure.

One block diagram for an operating system 300 is shown in FIG. 3. In this system, a first circuit includes a first loading tool 302 and a first processor 304. A neighboring circuit includes a second loading tool 306 and a second processor 308. Due to the physical distance between the two circuits, the dispatcher 212 may simply elect to cycle the haul trucks assigned to each circuit between the same two locations, and to optimize the operation based on the travel time such that queues 118 and 126 (FIG. 1) are minimized at the production tools and processing dump sites. Accordingly, when the system 300 operates, loaded or production arcs 310 are assigned between the first loading tool 302 and first processor 304, and empty or return arcs 312 are assigned between the first processor 304 and the first loading tool 302. Similarly, production arcs 314 and corresponding return arcs 316 are cycled, assigned, or allocated between the second loading tool 306 and the second processor 308.

Figure 4:
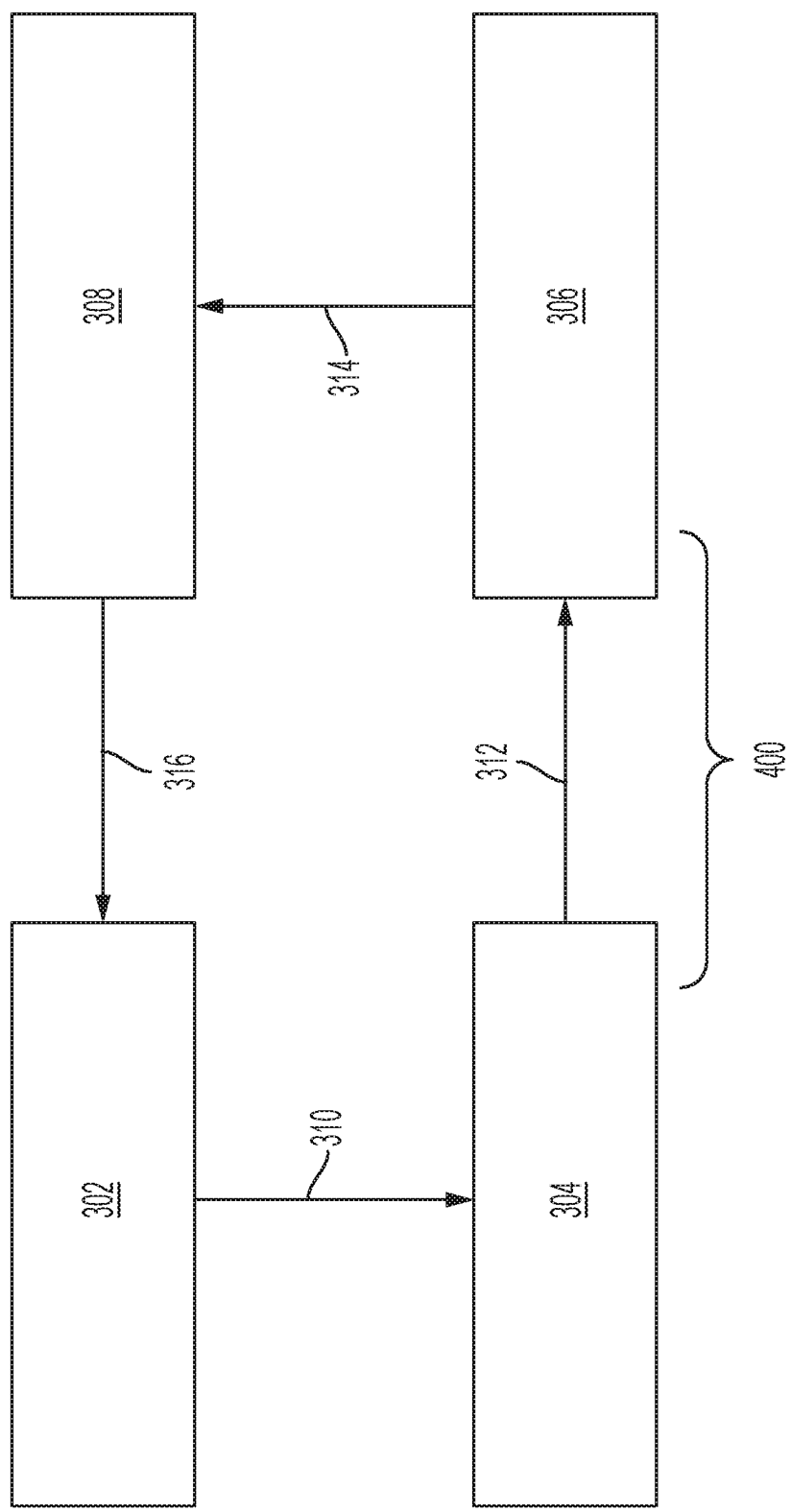

Another block diagram for an operating system 400 is shown in FIG. 4. In this diagram, for the sake of description, the same loading tools and processors are shown as in the system 300 shown in FIG. 3, but their locations have changed to account for, possibly, a mine site in which the physical location of these areas, or the travel time between them has changed. As can be seen, these two circuits may operate in a combined fashion in which, as before, production arcs 310 from the first loading tool 302 are routed to the first processor 304, and production arcs 314 from the second loading tool 306 are routed to the second processor 308, but the corresponding return arcs 312 and 316 are switched between the two circuits, for example, when the first loading tool 302 is closer to the second processor 308, or the second loading tool 304 is closer to the first processor 304. In this arrangement, the return arc 312 from the first processor 304 is routed to the second loading tool 306, rather than the first loading tool 302. Likewise, the return arc 316 from the second processor 308 is routed to the first loading tool 302, instead of the second loading tool 306. In a way, the haul trucks in the system 400 are constantly circling both loading tools and both processors in alternating sequence.

Figure 5:
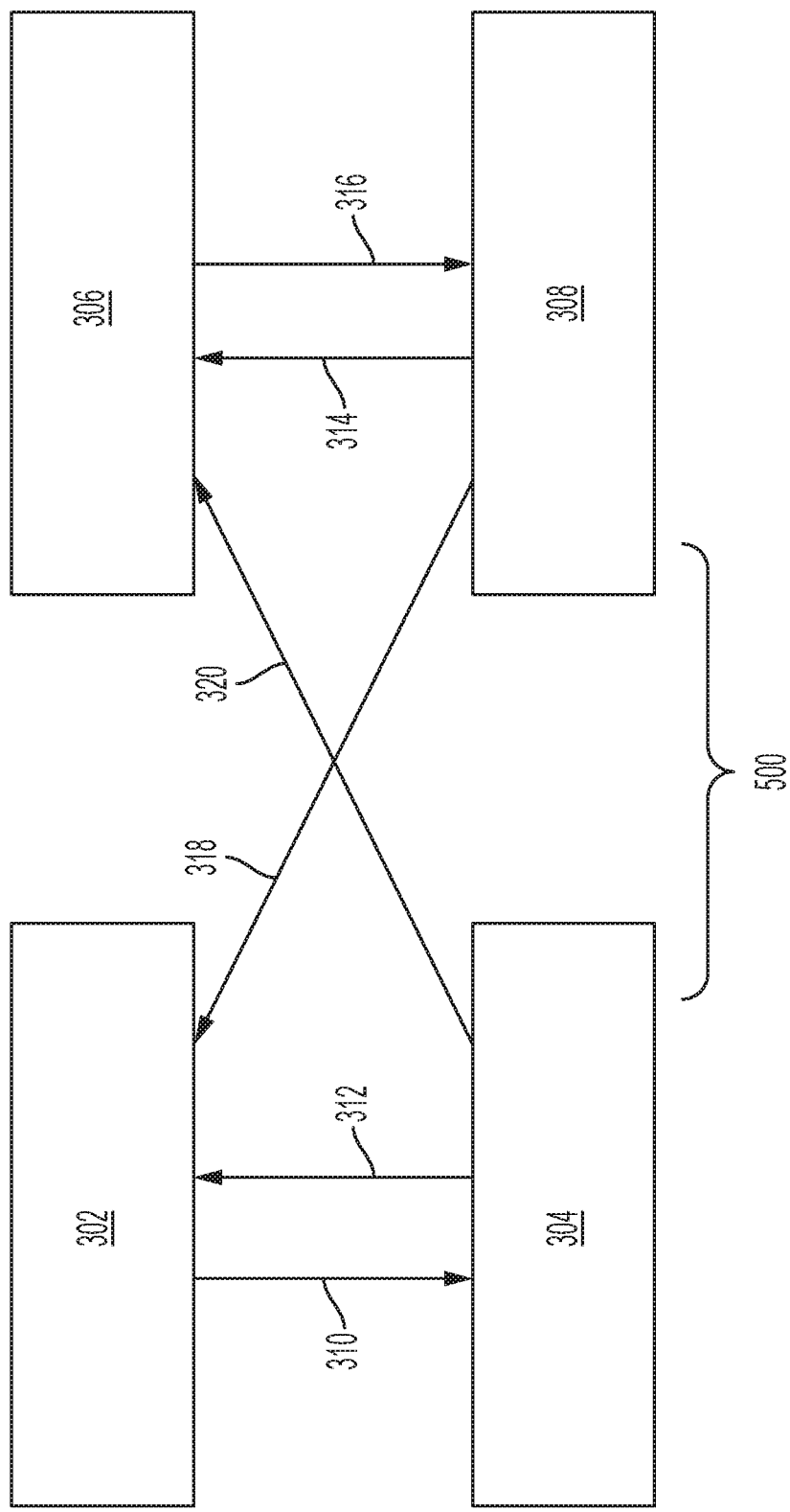

An additional block diagram for an operating system 500 is shown in FIG. 5. In this diagram, for the sake of description, the same loading tools and processors are shown as in the systems 300 and 400, shown in FIGS. 3 and 4, but their locations have changed to account for, possibly, a mine site in which the physical location of these areas, or the travel time between them has changed. In this condition, a distance between the first loading tool and processor in the first circuit may be considerably different than the corresponding distance between the second loading tool and processor in the second circuit. As can be seen, these two circuits may operate in a combined fashion in which, as before, production arcs 310 from the first loading tool 302 are routed to the first processor 304, and production arcs 314 from the second loading tool 306 are routed to the second processor 308. Return arcs can take alternative routes such that a return arc 312 initiated at the first processor 304 may more optimally be routed back to the first loading tool 302 or to the second loading tool 306 via alternative return arc 320. Similarly, a return arc 314 initiated at the second processor 308 may be routed back to the second loading tool 306 or may alternatively be routed to the first loading tool 302 via alternative return arc 318.

As can be appreciated, whether the in-circuit or alternative return arc is selected will depend on the dispatcher's estimation of where the assets might be best utilized in real time, with reassignments of haul trucks between circuits being used to balance the ability of each circuit to achieve the best production rate. For example, a higher rate at the first circuit may cause more than half the trucks in that circuit to be in a loaded production arc while covering a large distance. This condition may lead to excess empty trucks, some of which may be, at least temporarily, reassigned to the second circuit via alternative return arc 320.

Figure 6:
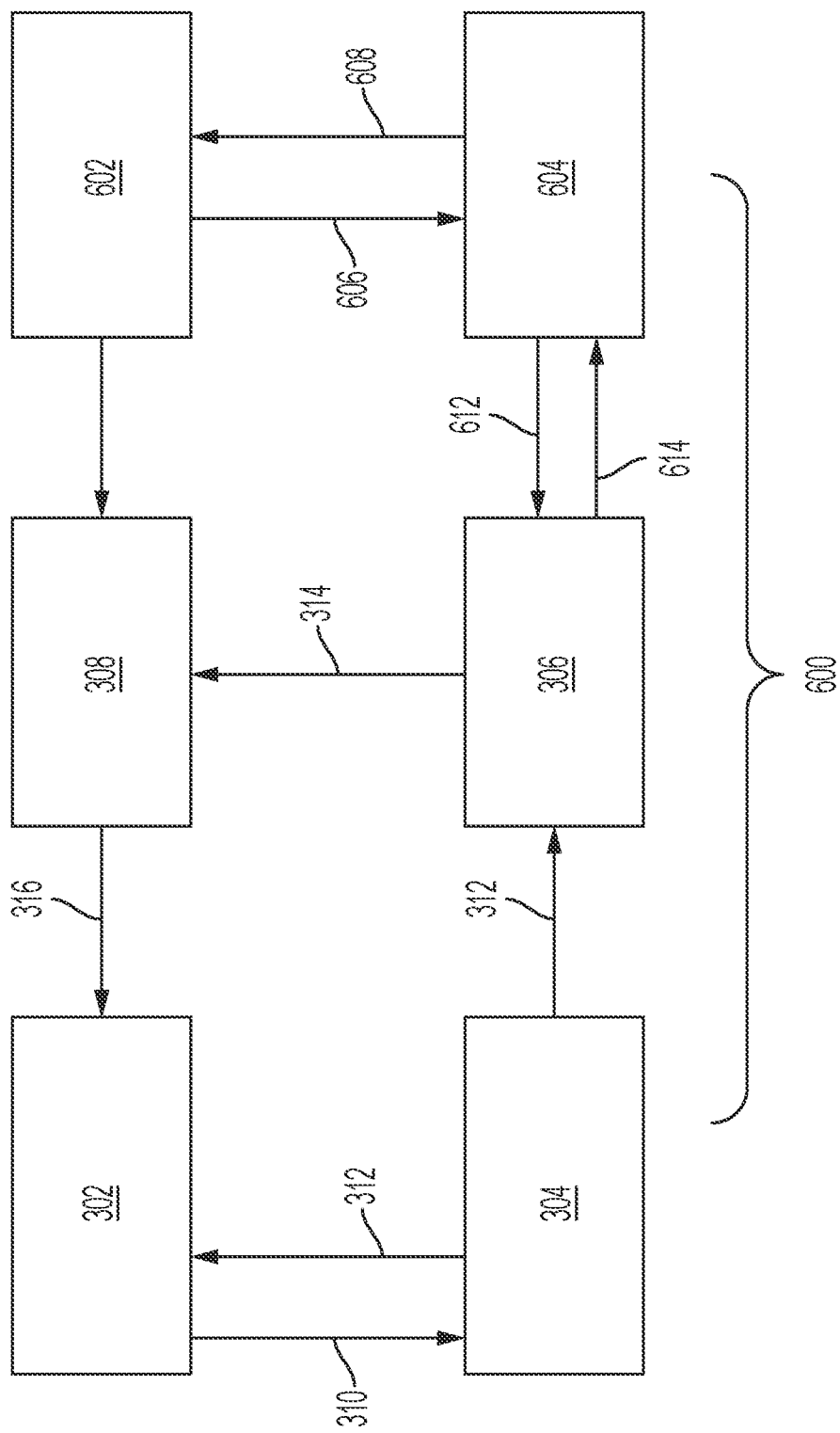

A more complex arrangement for a system 600, which further includes a third circuit having a third loading tool 602 and a third processor 604 is shown in FIG. 6. In this embodiment, it can be seen that the alternative return arc functionality described in the previous embodiments of systems 300, 400, and 500 can be combined and used simultaneously. Without describing the various arcs previously described, which are denoted by the same reference numerals previously used, and are routed as previously described, it can be seen that a third production arc 606 and corresponding third return arc 608 exists between the third loading tool 602 and third processor 604. However, due to proximity, time, different production goals etc., additional production arcs 614 exist from the second loading tool 306 to the third processor 604 and corresponding return arcs 612 are routed between the third processor 604 and second loading tool 306. Such situation may occur when a larger density of trucks is desired around the third processor 604, for example, if it is located further away from the other tools and processors. To balance the distribution of trucks at the mine, and avoid excessive clustering, which can lead to traffic congestion, a balancing routing configuration revolves around sending extra return arcs to the first production tool 302 via 312 and 316.

Figure 7:
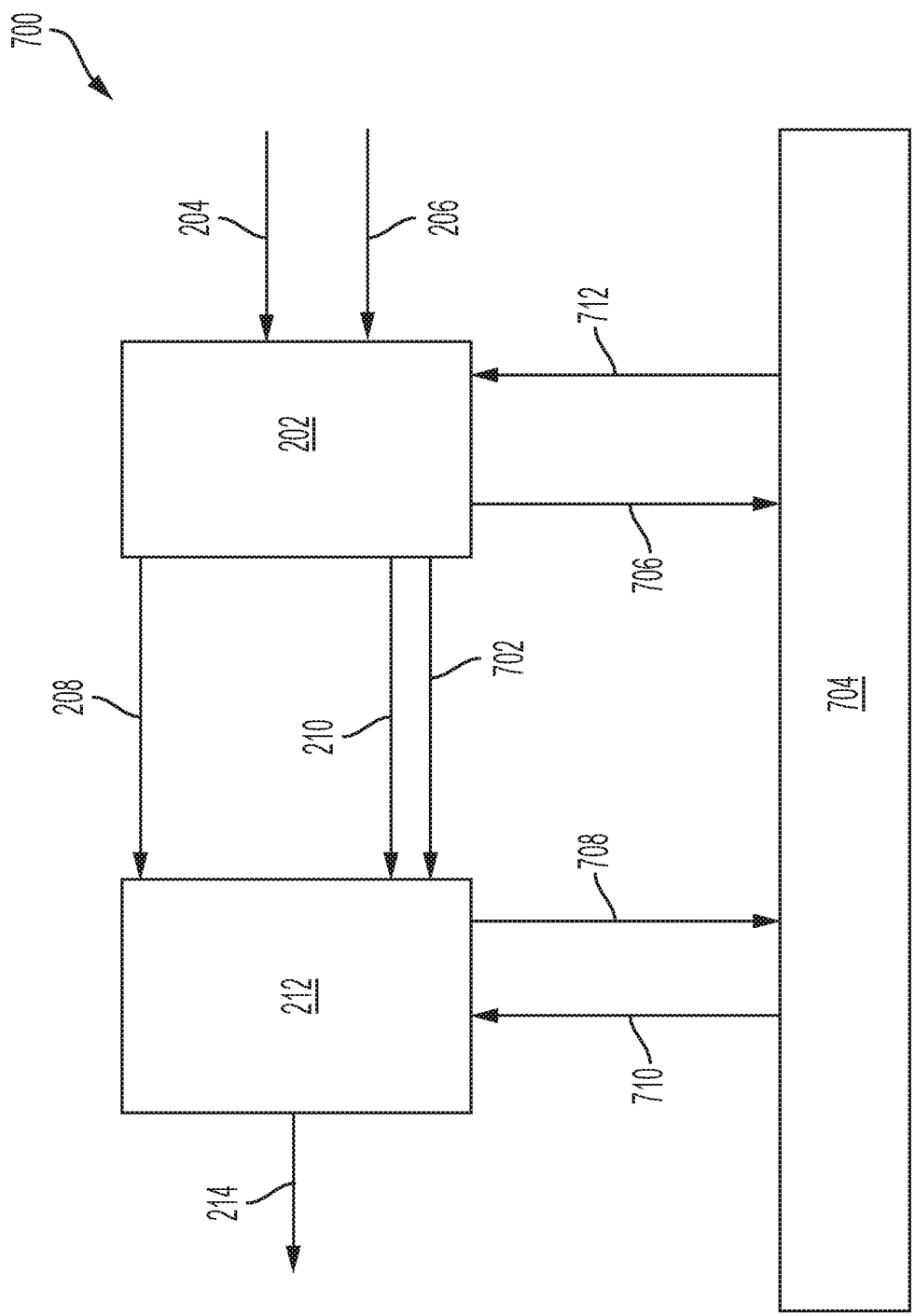
FIG. 7 is a block diagram of a dispatch system in accordance with a second embodiment of the disclosure.

FIG. 7 is a block diagram of a dispatch system 700 in accordance with a second embodiment of the disclosure. The dispatch system 700 builds onto the dispatch system 200 (FIG. 2) that was previously described, but also includes additional functionality to address the quickly mounting complexity that is introduced in large mining operations having two, three or more circuits. In this system, features and systems that are the same or similar as corresponding features and systems previously described relative to FIG. 2 are denoted by the same reference numerals as previously used for ease of understanding and simplicity.

As can be appreciated, large mining operations that include two, three or more circuits can quickly develop multiple possible production and return arcs, as well as balancing arcs 702, which like the alternative return arcs describe above can be used to reassign trucks between different circuits either temporarily or on a rolling basis. The production planner 202 of the system 700, in addition to determining production and return arcs 208 and 210, is further configured to also determine possible balancing arcs 702, which are provided to the dispatcher 212. These balancing arcs 702 can be used to fill gaps in the assets operating any one circuit or combinations of circuits, especially at times when production plans change. Moreover, processing these various types of arcs for optimization for a given mine site can result in a large commitment for any particular haul truck, which may traverse different areas of a mine at different times during a shift. Such operation may take the haul truck away from housekeeping services, for example, machine shops in case of a failure, fuel depos for refueling, inspection stations and the like. To oversee the multitude of different operating positions of assets, while still tracking assets such as haul trucks that go "offline" for service, refueling, inspection and the like, the balancing arcs 702 can reassign haul trucks, for example, to run a circuit that is close to a service station, fuel depot, and the like to minimize the time the truck is taken out of service.

To aid in this additional layer of complexity, the system 700 further includes a virtual controller service (VCS) 704. The VCS 704 acts in conjunction with the production planner 202 and dispatcher 212 to monitor overall operations and, when appropriate, intervene to reallocate system resources for system resource optimization. This can be accomplished, in part, by monitoring target productivity versus actual productivity. For example, the production planner 202 may provide information consistent with the expected or predicted travel and service times 706 for haul trucks executing the production arcs 208, return arcs 210 and balancing arcs 702, which the production planner 202 uses during its estimations or calculations. The virtual controller 704 may further receive the actual travel and service times 708 corresponding to the same haul trucks to determine whether any discrepancies exist that might affect overall system operation. Various parameters can affect such discrepancies, including weather impacting traction, visibility and the like, which may increase travel times at the mine site, obstructions such as avalanches, landslides, or degraded road conditions, and the like. When discrepancies are determined to exist, immediate action can be taken by providing adjustments 710 to the actual dispatch signals provided by the dispatcher, and also feedback 712 to the production planner 202 such that future adjustments can be made. Adjustments can include reassignments of haul trucks, addition of production arcs to counter slower haul truck travel speeds, selection of different balancing arcs, and the like, to ensure optimal asset utilization at the site.

It is contemplated that the function of the virtual controller 704 will augment the operation of the production planner 202 and dispatcher 212 through the application of machine learning and other AI techniques. The virtual controller 704 will monitor the global state of the system and intervene as appropriate to improve overall productivity and compliance with the production plan 204. The actions to be performed by the virtual controller 704 can include monitoring all assignments to optimize arrival times and minimize queue times, which can include constant monitoring of actual travel times and service times as compared to predicted travel times and service times. Where actual times start to deviate from predicted times, the virtual controller may take action immediately to better balance the flow of trucks along the defined production and return arcs at any time without the need of waiting for a haul truck to reach a re-assignment waypoint. The virtual controller 704 further operates to monitor deviations of actual travel times and service times for trucks with active scheduled assignments. When actual travel or service times start to deviate from expected times, action is taken immediately to activate the scheduled assignments to better achieve required arrival times (including arrive after and arrive before times).

The virtual controller may further communicate with other assets at the mine site. For example, it can monitor crushers and/or coarse ("COS") for potential "Black Belt," which describes a condition in which incoming material is insufficient to occupy a rock crusher continuously, i.e., the rate of incoming material is below the throughput of the crusher. When potential Black Belt is predicted, the virtual controller may take immediate action to avoid Black Belt, for example, by rerouting loaded trucks to that crusher. Moreover, the virtual controller may monitor all assignments for compliance with the active production plan and take immediate action to re-assign trucks that are currently on an obsolete assignment (from a previous production plan)

that is not in compliance with the recently changed active production plan (e.g. where the production plan has changed recently). The virtual controller may further consider site specific traffic and safety policies so that all assignments made by the virtual controller are made in compliance with site specific policies.

INDUSTRIAL APPLICABILITY

In the embodiment for the systems 200, shown in FIG. 2, and the system 700 shown in FIG. 7, it is contemplated that the production planner 202 works on 10-30 minute periods over which the available resources (indicated via mine state information 206) are assumed to remain constant. The production planner 202 performs the complex optimizations required to determine the optimal paths for haul trucks to follow within the constraints of predicted travel and service times. The dispatcher 212 works much more rapidly, for example, on 0-5 second periods, to respond immediately to haul trucks that need new assignments. Where actual travel and service times are close to predicted times, the assignments made by the dispatcher 212 will suffice to implement the production plan 204 as calculated by the production planner 202.

In the embodiment for the system 700 shown in FIG. 7, the virtual controller 704 operates to bridge the gap between the production planner 202 and the dispatcher 212 to better respond to situations where actual travel and service times deviate from the predicted times. The virtual controller 704, from a global perspective takes immediate action to optimize compliance to the production plan where actual times deviate from predicted times. One functional objective of the virtual controller is to continuously respond to deviations from predicted travel and service times so that manual intervention by users or operators is not consistently required. The virtual controller is configured to mitigate anomalous situations as well as, or better than, a human dispatcher or operator.

Figure 8:
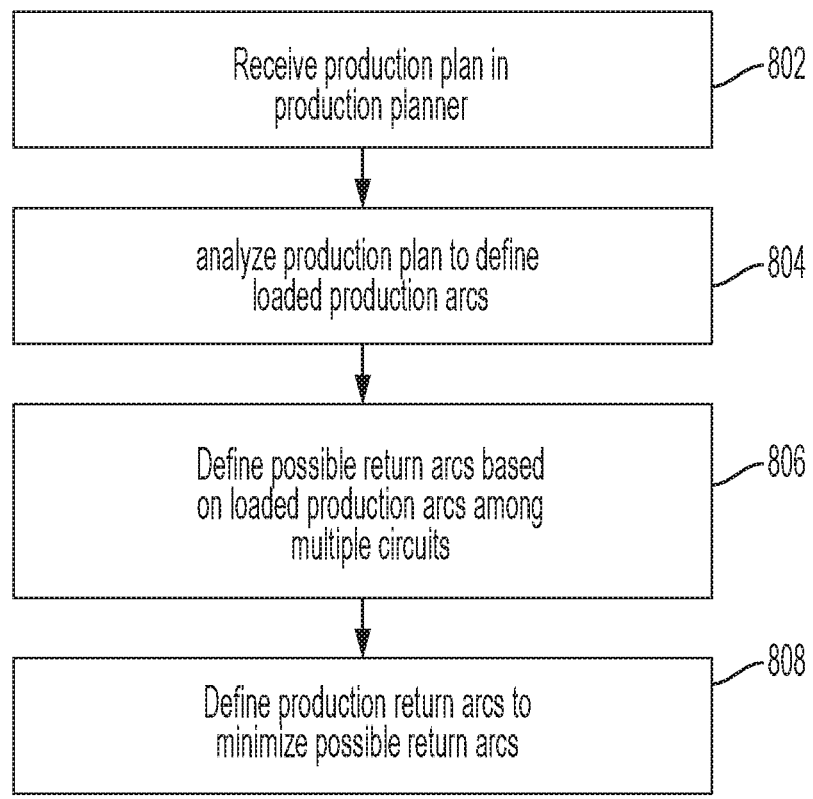
FIG. 8 is a flowchart of a first embodiment of a method of dispatching haul trucks in a mining site in accordance with the disclosure.

FIG. 8 is a flowchart of a first embodiment of a method of dispatching haul trucks in a mining site in accordance with the disclosure. In accordance with the method, a production plan is provided, which is input or otherwise received in a production planner at 802. The production plan is analyzed in the production planner, as described above, to define the number, frequency, location and other attributes required to achieve the production plan on the basis of the production arcs that are required to be fulfilled by haul trucks at 804. With the production arcs defined, a plurality of return arcs are defined, which may be limited to a single circuit or span more than one circuit at 806. Using computational methods, artificial intelligence techniques, machine learning algorithms and the like, the production planner defines a particular set of return arcs from the plurality of return arcs at 808.

Figure 9:
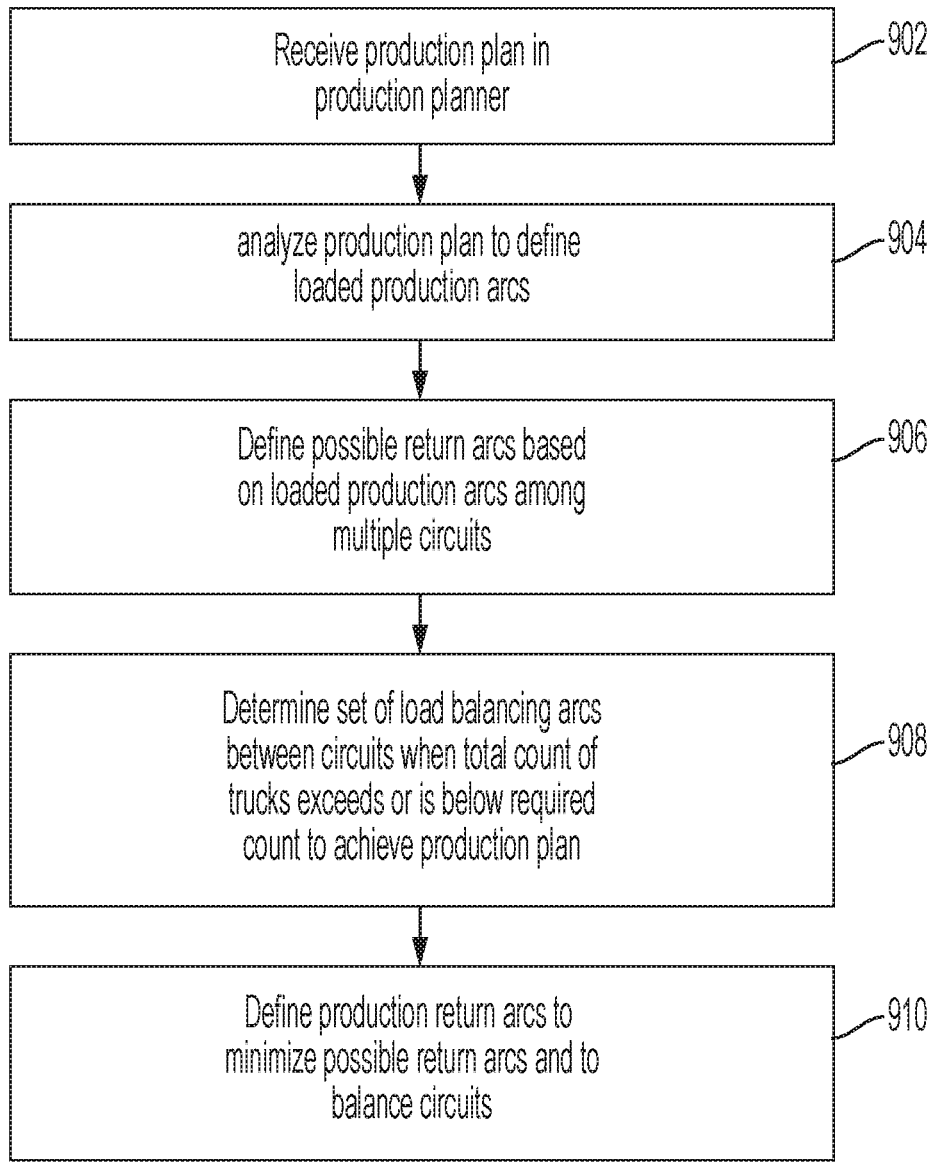
FIG. 9 is a flowchart of a second embodiment of a method of dispatching haul trucks in a mining site in accordance with the disclosure.

FIG. 9 is a flowchart of a second embodiment of a method of dispatching haul trucks in a mining site in accordance with the disclosure. In this embodiment, a production plan is provided, which is input or otherwise received in a production planner at 902. The production plan is analyzed in the production planner, as described above, to define the number, frequency, location and other attributes required to achieve the production plan on the basis of the production arcs that are required to be traversed by haul trucks at 904. With the production arcs defined, a plurality of return arcs are defined, which may be limited to a single circuit or span more than one circuit at 906.

At step 908, the method further determines specifically load balancing arcs, which are return or production arcs required to cross from one circuit to another, if a total number of trucks in any one circuit is different than the number of trucks required to achieve the target productivity according to the production plan for that particular circuit. Such changes may be prompted, for example, when the production plan for at least one circuit changes during operation of the mine, which may ultimately result in increasing the required production of one circuit, while decreasing the required production for another circuit. Once the production, return and balancing arcs have been established, the production planner uses computational methods, artificial intelligence techniques, machine learning algorithms and the like, to define a particular set of return arcs from the plurality of return arcs and a particular set of balancing arcs, which are implemented alongside the defined production arcs, at 910.

Figure 10:
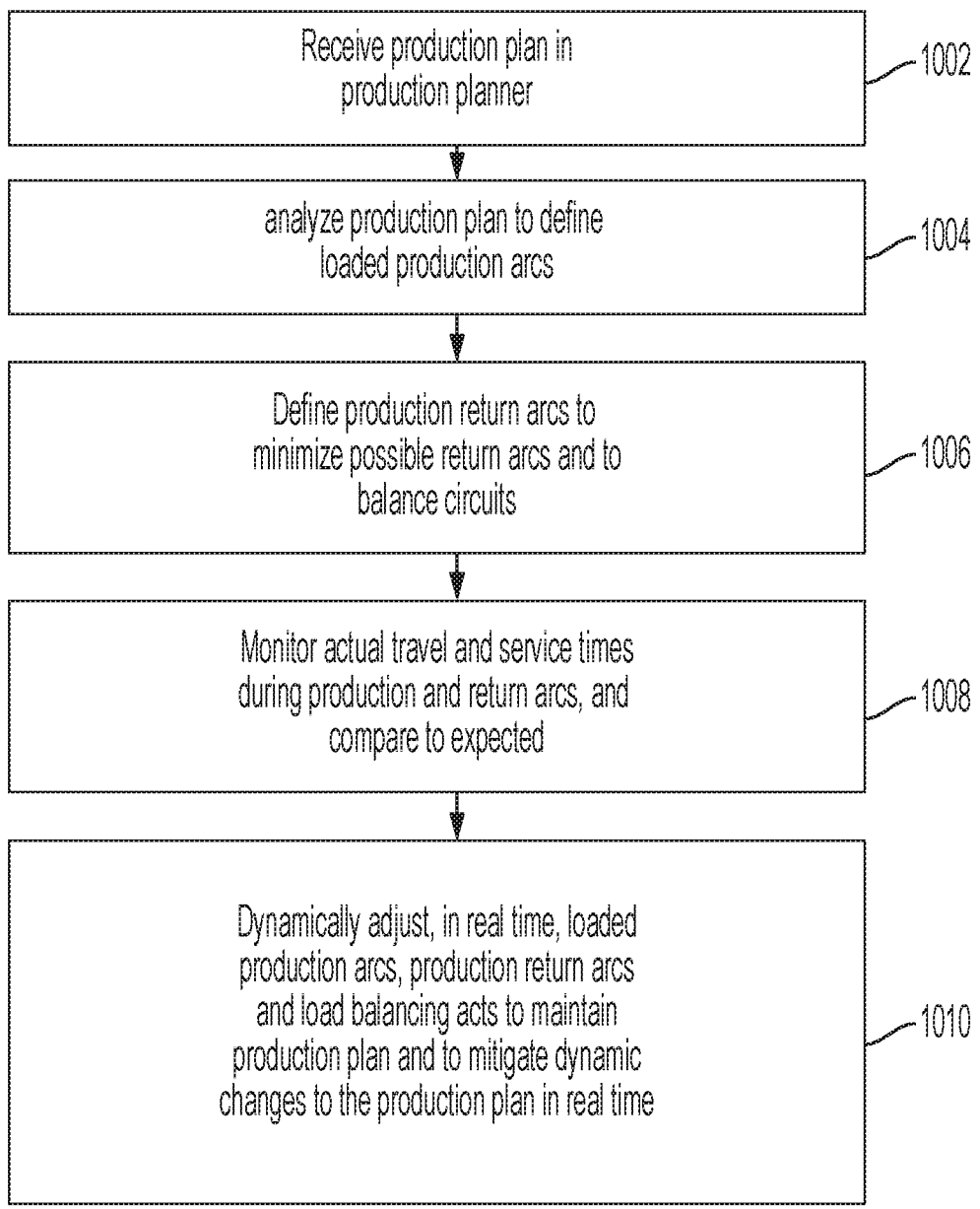
FIG. 10 is a flowchart of a third embodiment of a method of dispatching haul trucks in a mining site in accordance with the disclosure.

FIG. 10 is a flowchart of a third embodiment of a method of dispatching haul trucks in a mining site in accordance with the disclosure. In this embodiment, a production plan is provided, which is input or otherwise received in a production planner at 1002. The production plan is analyzed in the production planner, as described above, to define the number, frequency, location and other attributes required to achieve the production plan on the basis of the production arcs to be traversed by haul trucks at 1004. With the production arcs defined, a plurality of return arcs are defined, which may be limited to a single circuit or span more than one circuit, in which case they will constitute balancing acts, and all return and balancing arcs are optimized at 1006. The optimization of return and balancing arcs are determined in the production planner using computational methods, artificial intelligence techniques, machine learning algorithms and the like, to define a particular set of return arcs from the plurality of return arcs and a particular set of balancing arcs, which are implemented alongside the defined production arcs.

The method further includes defining expected or theoretical travel and service times for the defined production, return and balancing arcs, and providing the same to a virtual controller, as previously described. These theoretical or expected times are compared in the virtual controller with actual travel and service times, which are collected from the haul trucks operating in the field, at 1008. When discrepancies or differences between actual and expected travel and service times are detected, which can affect the production plan, e.g., when they exceed a threshold difference, then the virtual controller dynamically adjusts, in real time, the loaded production arcs, return arcs and balancing arcs to attempt to maintain, or at least approach, the production plan and to mitigate dynamic changes in the system, in real time, at 1010. Dynamic changes in the system can be "expected changes," such as changes in the production plan targets, or "unexpected changes," such as changed weather conditions, equipment failures, changing site conditions (avalanche, degraded roadways, safety restrictions, and others).

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

We claim:

1. A resource allocation optimization system for automatically controlling hauling operations of one or more autonomous haul trucks in order to maximize loaded travel time, the system comprising:
a production planner controller for serving a plurality of circuits, each of the plurality of circuits comprising at least one production site and at least one dump site, wherein the production planner controller comprises:
one or more processors; and
one or more memory devices having stored thereon instructions that when executed by the one or, more processors cause the one or more processors to:
determine for each of the plurality of circuits, a production plan comprising a production site, a dump site, a production plan, a set of production arcs and a set of return arcs, the production plan including information indicative of a production goal that includes a rate of transfer of material from the one or more loading haul trucks to the one or more dump sites within each of the plurality of circuits;
compute an estimated rate of transfer of material based on each of the one or more haul trucks executing each of the set of production arcs or return arcs;
receive an actual travel time from each of one or more haul trucks;
monitor an actual rate of transfer of material based on the received actual travel time for each of one or more haul trucks executing each of the set of production arcs or return arcs;
compare the estimated rate of transfer of material with the actual rate of transfer of material; and
when the actual rate of transfer of material is more than the estimated rate of transfer of material in one particular circuit of the plurality of circuits, reallocate resources away from the one particular circuit;
when the actual rate of transfer of material is less than the estimated rate of transfer of material in the one particular circuit, reallocate resources to the one particular circuit; and
when the actual rate of transfer of material is equal to the estimated rate of transfer of material, take no action regarding allocation of resources to the one particular circuit;
wherein, reallocating resources to/away from the one particular circuit is accomplished within the production planner controller, and includes executing computer executable instructions for:
computationally defining a set of production arcs to be executed by the one or more haul trucks for transferring material from the one or more loading tools to the one or more dump sites,
computationally developing a set of possible return arcs for each haul truck executing a particular one of the set of production arcs;
computationally selecting a sub-set of return arcs from the set of possible return arcs that minimizes return arc travel time of the one or more haul trucks; and
commanding a real time dispatcher controller, comprising one or more processors, to execute commands directing the one or more autonomous haul trucks to carry out the set of production arcs and the sub-set of return arcs.

2. The system of claim 1, wherein the production planner controller is further configured to:
compute an estimated time expected for each of the one or more haul trucks to execute each of the set of production arcs or return arcs;
monitor an actual time required for each of the one or more haul trucks to execute each of the set of production arcs or return arcs;
compare the estimated time with the actual time for each of the set of production arcs and the set of return arcs; and
when the actual time is less than the estimated time in one particular circuit of the plurality of circuits, reallocate resources away from the one particular circuit;
when the actual time is more than the estimated time in the one particular circuit, reallocate resources to the one particular circuit; and
when the actual time is equal to the estimated time, take no action regarding allocation of resources to the one particular circuit.

3. The system of claim 1, wherein the set of production arcs satisfies the production plan.

4. The system of claim 1, wherein computational selection of the sub-set of return arcs includes executing in the production planner controller computer-executable instructions.

5. The system of claim 4, wherein the computer executable instructions utilize computational methods, artificial intelligence techniques, or machine learning algorithms.

6. A method for automatically dispatching and controlling hauling operations of one or more autonomous haul trucks in order to maximize loaded travel time, the method comprising:
providing a production planner, comprising one or more processors for serving a plurality of circuits, each of the plurality of circuits including one or more loading tools and one or more dump sites, wherein the production planner is configured to operate based on a production plan;
computationally defining a set of production arcs to be executed by the one or more haul trucks for transferring material from the one or more loading tools to the one or more dump sites,
computationally developing a set of possible return arcs for each haul truck within one of the plurality of circuits executing a particular one of the set of production arcs;
determining a total truck count required for each of the plurality of circuits, and estimating an actual truck count required for each of the plurality of circuits;
computationally selecting a sub-set of return arcs from the set of possible return arcs to minimize return arc travel time of the one or more haul trucks; and
commanding a real time dispatcher, comprising one or more processors, to execute commands directing the one or more autonomous haul trucks to carry out the set of production arcs and the sub-set of return arcs.

7. The method of claim 6, wherein the set of production arcs satisfies the production plan.

8. The method of claim 6, wherein the production plan includes information indicative of a production goal that includes a rate of transfer of material from the one or more loading tools to the one or more dump sites within each of the plurality of circuits.

9. The method of claim 6, wherein the sub-set of return arcs includes return arcs within a particular one of the plurality of circuits.

10. The method of claim 6, wherein the sub-set of return arcs that is computationally selected includes one or more load balancing arcs between two different circuits from the plurality of circuits.

11. The method of claim 6, wherein computationally selecting the sub-set of return arcs includes using computational methods, artificial intelligence techniques, or machine learning algorithms.

12. A system for automatically dispatching and controlling hauling operations of one or more autonomous haul trucks in order to maximize loaded travel time, the system comprising:
 a production planner controller for serving a plurality of circuits, each of the plurality of circuits including one or more loading tools and one or more dump sites, wherein the production planner controller is configured to operate based on a production plan;
 wherein the production planner controller comprises:
 one or more processors; and
 one or more memory devices having stored thereon instructions that when executed by the one or more processors cause the one or more processors to:
 computationally define a set of production arcs to be executed by the one or more haul trucks for transferring material from the one or more loading tools to the one or more dump sites that satisfies the production plan,
 computationally develop a set of return arcs to be executed by the one or more haul trucks for travelling from the one or more dump sites to one of the one or more loading tools, wherein the set of return arcs minimizes return arc travel time of the one or more haul trucks;
 a dispatcher controller, comprising one or more processors, configured to execute commands directing the one or more autonomous haul trucks to carry out the set of production arcs and the set of return arcs at an expected travel time and service time for each; and
 a virtual controller, comprising one or more processors, configured to:
 receive actual travel and service times from each of the one or more haul trucks,
 compare the actual travel and service times with the expected travel time and service time for each haul truck to determine an actual production rate, and
 automatically adjust the set of production arcs and the set of return arcs to minimize any difference between the actual production rate and the desired production goal.

13. The system of claim 12, wherein the production plan includes information indicative of a desired production goal that includes a rate of transfer of material from the one or more loading tools to the one or more dump sites within each of the plurality of circuits.

14. The system of claim 12, wherein computationally developing the set of return arcs includes using computational methods, artificial intelligence techniques, or machine learning algorithms in the form of computer executable instructions executed within the production planner.

15. The system of claim 12, wherein the virtual controller adjusts the set of production arcs in real time.

16. The system of claim 12, wherein the virtual controller adjusts the set of return arcs in real time.

17. The system of claim 12, wherein the production planner operates on a period of 10-30 minutes, and wherein the virtual controller operates on a period of 0-5 seconds.

* * * * *